United States Patent [19]

Perkins

[11] 4,244,047

[45] Jan. 6, 1981

[54] MULTIPLEXED CARRIER TRANSMISSION THROUGH HARMONIC POLLUTED MEDIUM

[75] Inventor: William C. Perkins, Sachse, Tex.

[73] Assignee: Rockwell International Corporation, El Segundo, Calif.

[21] Appl. No.: 22,235

[22] Filed: Mar. 20, 1979

[51] Int. Cl.³ .............................. H04J 1/02; H04J 1/20
[52] U.S. Cl. ...................................... 370/69; 370/70; 375/58; 375/60; 375/51
[58] Field of Search ................ 370/69, 70, 6; 375/41, 375/51, 58, 60; 179/2.51; 340/310 A, 310 R

[56] References Cited

U.S. PATENT DOCUMENTS

| 3,163,718 | 12/1964 | Deman | 370/69 |
| 3,202,762 | 8/1965 | Aaron et al. | 370/69 |
| 3,364,311 | 1/1968 | Webb | 370/69 |
| 3,603,882 | 9/1971 | Wilson | 370/69 |

Primary Examiner—Douglas W. Olms

Attorney, Agent, or Firm—Howard R. Greenberg; H. Fredrick Hamann

[57] ABSTRACT

Multiplexed carrier signals modulated with digital data are transmitted through a medium polluted with harmonic signals by asymmetrically positioning the frequency of one of the carrier signals between two of the adjacent system harmonics, modulating that carrier signal with digital data at a baud rate so that the spectral density nulls of the modulated carrier signal in the frequency domain coincide with the two adjacent system harmonics to which spectral distribution the detector response is matched, generating at least one additional carrier signal whose frequency is also positioned between the two same adjacent system harmonics but is different from that of the other carrier signal and whose frequency separation from any adjacent carrier signal is equal to the baud rate or some multiple thereof, and modulating each additional carrier signal with digital data at the same baud rate.

7 Claims, 8 Drawing Figures

MULTIPLEXED CARRIER TRANSMISSION THROUGH HARMONIC POLLUTED MEDIUM

BACKGROUND OF THE INVENTION

The subject invention pertains generally to electronic communications and specifically to communications systems entailing the transmission of digital data via modulated carrier signals through a medium polluted with harmonic signals.

The transmission of digital data by carrier signal through some medium may entail discriminating against harmonic signals which pollute the medium in order to properly detect and demodulate the carrier signal to retrieve the data. An example of such a system is the use of electric power systems as a communications channel for data which allows utility customer loads to be monitored for accounting purposes and controlled for load management from a central remote site. In addition to the broadand and impulse noise found on a power system which pose a hostile environment for communications signals, harmonic noise consisting of harmonics of the power system fundamental frequency (e.g. 60 hertz in the United States and 50 hertz in European countries) and hereinafter referred to as system harmonics must be obviated if a meaningful communication signal is to be transmitted and received using reasonable amounts of communication signal power.

In a copending patent application filed concurrently herewith entitled "Carrier Transmission Through Harmonic Polluted Medium" owned by the same assignee as the instant application, the foregoing problem is addressed by asymmetrically positioning the carrier signal between two adjacent system harmonics and employing a baud rate for the data so that all system harmonics, including the two adjacent harmonics coincide with the (sin x)/x spectral density nulls [where $x = \pi T(F - F_c)$ with F being the frequency variable, $F_c$ the carrier frequency and T the baud period] of the modulated carrier signal in the frequency domain, thus affording efficacious discrimination against the system harmonics in the receiver detector having a matching time and frequency response. As taught therein, if greater discrimination against the system harmonics is desired, then additional minor lobes can be interposed between the carrier signal and the adjacent system harmonics, so that transmitted energy and matched receive filter sensitivity associated with lobes near the harmonics are reduced, but only at the expense of reduced data rates. In a time of rapidly increasing data communications, such a constraint may be a serious impediment to any commercially viable communications system.

Apart from benefits that may be exploited as taught in the cited copending patent application, it is advantageous to provide a means of increasing and/or optimizing data rates in a limited bandwidth, while still achieving discrimination against the system harmonics by continuing to render the spectral density nulls of all communication signals coincident with the system harmonic frequencies and providing the corresponding spectral density matched detectors.

With the foregoing in mind, it is a primary object of the present invention to provide a new and improved means for transmitting and receiving digital data modulated communication signals via a medium polluted with system harmonic signals.

It is a further object of the present invention to provide such a new and improved means which affords an increase and/or optimization of data rates within a limited bandwidth without loss in system harmonic discrimination.

The foregoing objects as well as others and the means by which they are achieved through the present invention may best be appreciated by referring to the Detailed Description of the Invention which follows together with the appended drawings.

BRIEF DESCRIPTION OF THE INVENTION

In accordance with the foregoing objects, the present invention affords increased data rates without any loss of discrimination against system harmonic signals, polluting a medium through which digital data is to be transmitted by a carrier signal, by multiplexing carrier signals between two adjacent system harmonics in lieu of a single carrier signal, as employed in the prior art, and asymmetrically positioning the carrier signals with or without a centered carrier signal relative to the adjacent system harmonics and modulating them at a baud rate so that the (sin x)/x spectral density nulls of all of the carrier signals in the frequency domain coincide with the adjacent system harmonics to which the receiver detector frequency response is matched. Each carrier signal thus affords an additional channel over which to transmit digital data so as to increase the total amount of data which may be transmitted in any given unit of time. Even with a limited amount of transmitter power which must be spread among the plural carrier signals, thus imposing a constraint resulting from signal to noise considerations, it is shown that considerably improved data rates can be achieved within a limited bandwidth without loss in system harmonic discrimination.

DETAILED DESCRIPTION OF THE INVENTION

Figure 1A:
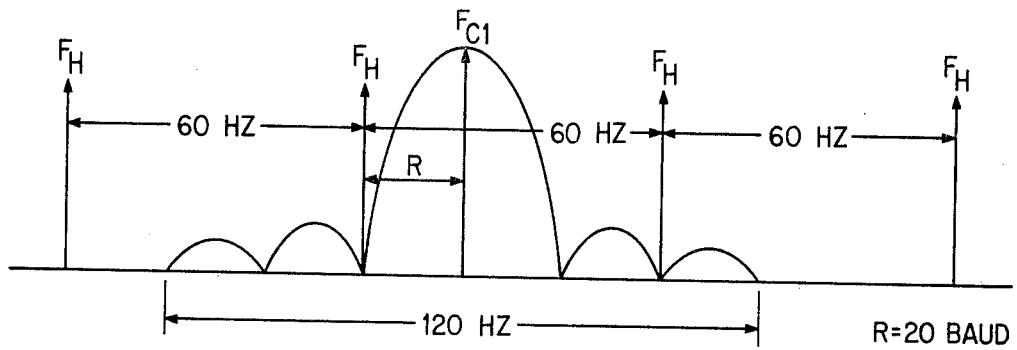
FIGS. 1a-1d are (sin x)/x representations in the frequency domain of the digital data modulated carrier signals and concomitant receiver detector frequency responses for one-four multiplexed channels, respectively.

As delineated in copending application, Ser. No. 015,672, previously alluded to under Background of the Invention, digital data can be successfully transmitted by a carrier signal through a medium polluted with system harmonic signals, such as an electric power system with the pollution signals being harmonics of the fundamental power system frequency, by asymmetrically positioning the carrier signal between two adjacent system harmonics and modulating the carrier signal at a baud rate so that the (sin x)/x spectral nulls of the carrier signal in the frequency domain coincide with the system harmonics, to which spectral distribution the receiver detector response is matched. This is accomplished by setting the baud rate to a submultiple of the fundamental system frequency and selecting a carrier signal whose frequency differs from that of the nearer of the adjacent system harmonics by the same submultiple of the system fundamental frequency. This is exemplified by FIG. 1a wherein the data rate R is 20 baud. The negative lobes of the well known (sin x)/x function [where $x = \pi T(F - F_c)$, F being the frequency variable, $F_c$ the carrier frequency and T the baud period] have been inverted to represent absolute values. If it is assumed that efficacious detection of the modulated data borne by the carrier signal $F_{c1}$ can be accomplished by retrieving the energy contained in the main lobe together with two side lobes at each side of the main lobe, then it is to be noted that 120 hertz of bandwidth are required for a transmission data rate of 20 baud. This equates to 6 hertz per single baud or 0.167 baud per hertz which is true irrespective of the data rate for an individual frequency channel based on the foregoing matching constraints. If a higher data rate were desired, which is not uncommon with burgeoning data communications, such could be accomplished using a single channel but only at the expense of reduced harmonic discrimination based on the aforementioned copending application. For example, if a data rate of 30 baud were employed centering the carrier signal between the two adjacent harmonics, then there would not be a lower level lobe between the main response lobe surrounding the carrier signal and the higher frequency harmonic, but rather none, thereby adversely affecting the discrimination therebetween. Although additional frequency channels could be introduced outside of the frequency range between the two adjacent harmonics, this then necessitates the utilization of a greater frequency range which may not be available because of limited frequency spectrum for communications in the medium through which the communications are passed.

Figure 1B:
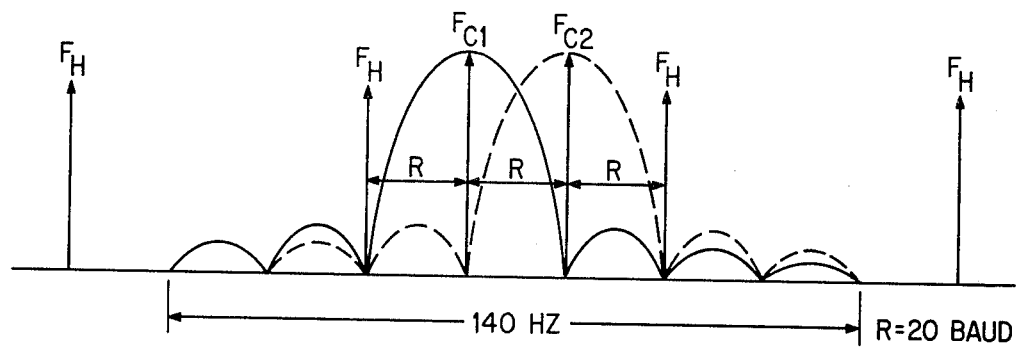

Without loss in harmonic discrimination, the invention herein affords higher data rates while conserving the frequency range for communications by multiplexing carrier signals between the same two adjacent harmonics and modulating them with digital data so that the (sin x)/x spectral density nulls appertain thereto. For example, looking at FIG. 1b, it will be seen that a second carrier signal $F_{c2}$ has been interposed between the same two adjacent harmonics as the first carrier signal $F_{c1}$, with its frequency displacement from both the nearer harmonic frequency and the other carrier signal being equal to 20 hertz. When modulated at the same rate of 20 baud as the first carrier signal $F_{c1}$, the second one $F_{c2}$ exhibits nulls ($F_{c2}$ waveform shown dashed) at both adjacent harmonics as well as at the other carrier signal, as does the first. Once again, considering all of the energy necessary for successful detection of the digital data as being contained in the main lobe of the carrier signal together with its two pairs of side lobes, it is to be noted that the total bandwidth required for a composite transmission rate of 40 baud (20 baud per frequency channel) is 140 hertz as compared with the previous 120 hertz for 20 baud. Thus the transmission data rate was doubled without loss of any harmonic discrimination by expanding the bandwidth by only 20 hertz or 16.7% of that for a single channel. Using two channels as depicted in FIG. 1b requires only 3.5 hertz per unit baud affording 0.29 baud of data transmission per unit hertz.

Figure 1C:
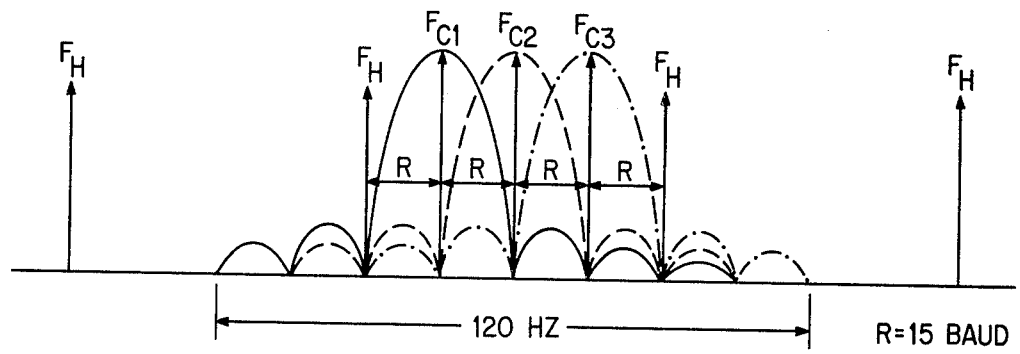
Figure 1D:
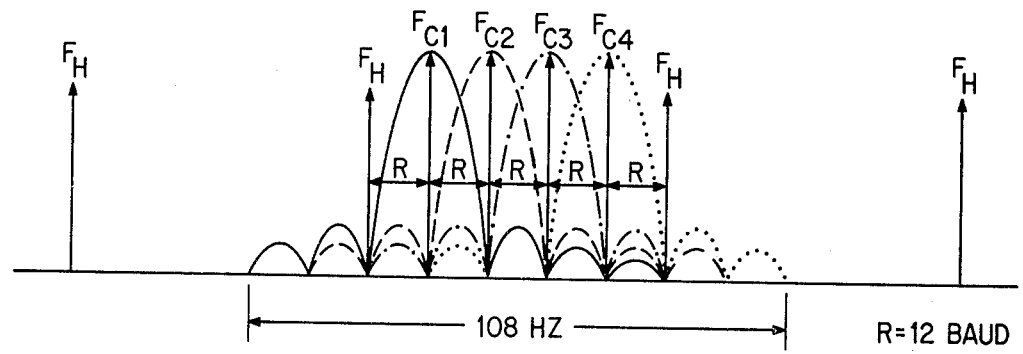

Two additional examples of the increased data transmission without loss of harmonic discrimination while conserving frequency bandwidth are pictorially represented in FIGS. 1c and 1d for three and four channels, respectively (with the minor centered lobe between $F_{c2}$ and $F_{c3}$ representing a first side lobe for both $F_{c1}$ and $F_{c4}$). The improvements derived therefrom are tabulated hereinbelow wherein it will be noted that as the number of channels increases the incremental improvement in baud per unit bandwidth decreases. Thus, at some point, with a limited amount of transmitter power that must be spread over the multiplexed carrier signals, the loss in signal to noise ratio becomes a more critical consideration so as to militate against increasing the number of channels any further. But until that point is reached, dependent upon the particular characteristics of the medium over which the communication signals are to be transmitted and the communications equipment to be employed therewith, the benefits of multiplexing carrier signals between the two same adjacent harmonics can be realized.

Data Rate Improvement With Increasing Multiplexed Channels

| No. of Channels | Baud/ Channel | Total Baud | BW(HZ) | BW/Unit Baud (HZ/Baud) | Baud Unit BW (Baud/HZ) |
|---|---|---|---|---|---|
| 1 | 20 | 20 | 120 | 6 | 0.17 |
| 2 | 20 | 40 | 140 | 3.5 | 0.29 |
| 3 | 15 | 45 | 120 | 2.67 | 0.38 |
| 4 | 12 | 48 | 108 | 2.25 | 0.45 |

Figure 2:
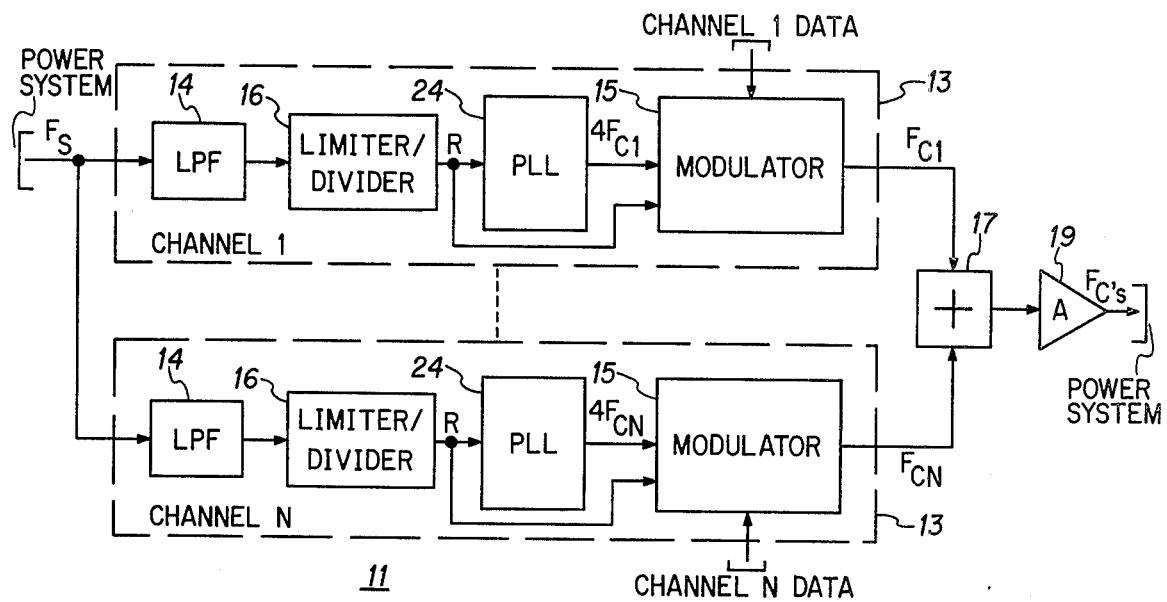
FIG. 2 is a block diagram of a multiplex transmitter for implementing the invention herein.

Only for exemplary purposes, apparatus for implementing the invention herein will be described in the context of a four-phase differential phase shift keyed (DPSK) modulation scheme employed in a commercial communications system known as Kineplex which is sold by the application assignee herein and which is described in detail in U.S. Pat. No. 3,368,036 entitled "Demultiplexing and Detecting System For Predicted Wave Phase-Pulsed Data Transmission System". A multiplex transmitter, designated generally by the reference numeral 11, for implementing the invention herein is shown in FIG. 2. Transmitter 11 comprises N plurality of frequency channels 13, each constituting a series path through which the fundamental system frequency $F_s$ is passed and consisting of a low pass filter 14 for rejecting all signals above $F_s$, a limiter/divider 16 for providing from $F_s$ a square wave having the appropriate submultiple frequency thereof, a phase lock loop circuit 24 for developing a carrier signal $4F_{c1}$ (the multiplier four only arising from the four-phase modulation scheme employed) which is synchronized in frequency to the selected submultiple of $F_s$ and a modulator 15 wherein the digital data which is to be transmitted is modulated onto the carrier signal. The output of limiter/divider 16 is also applied directly to modulator 15 for baud timing control. The outputs of the modulators 15 of the individual channels 13 are consolidated into a composite signal by summer 17 and preferably linearly amplified by amplifier 19 before being placed onto the power system for transmission to the receiver. If desired, a common low pass filter 14 and limiter/divider 16 can be shared by all channels 13.

Figure 3:
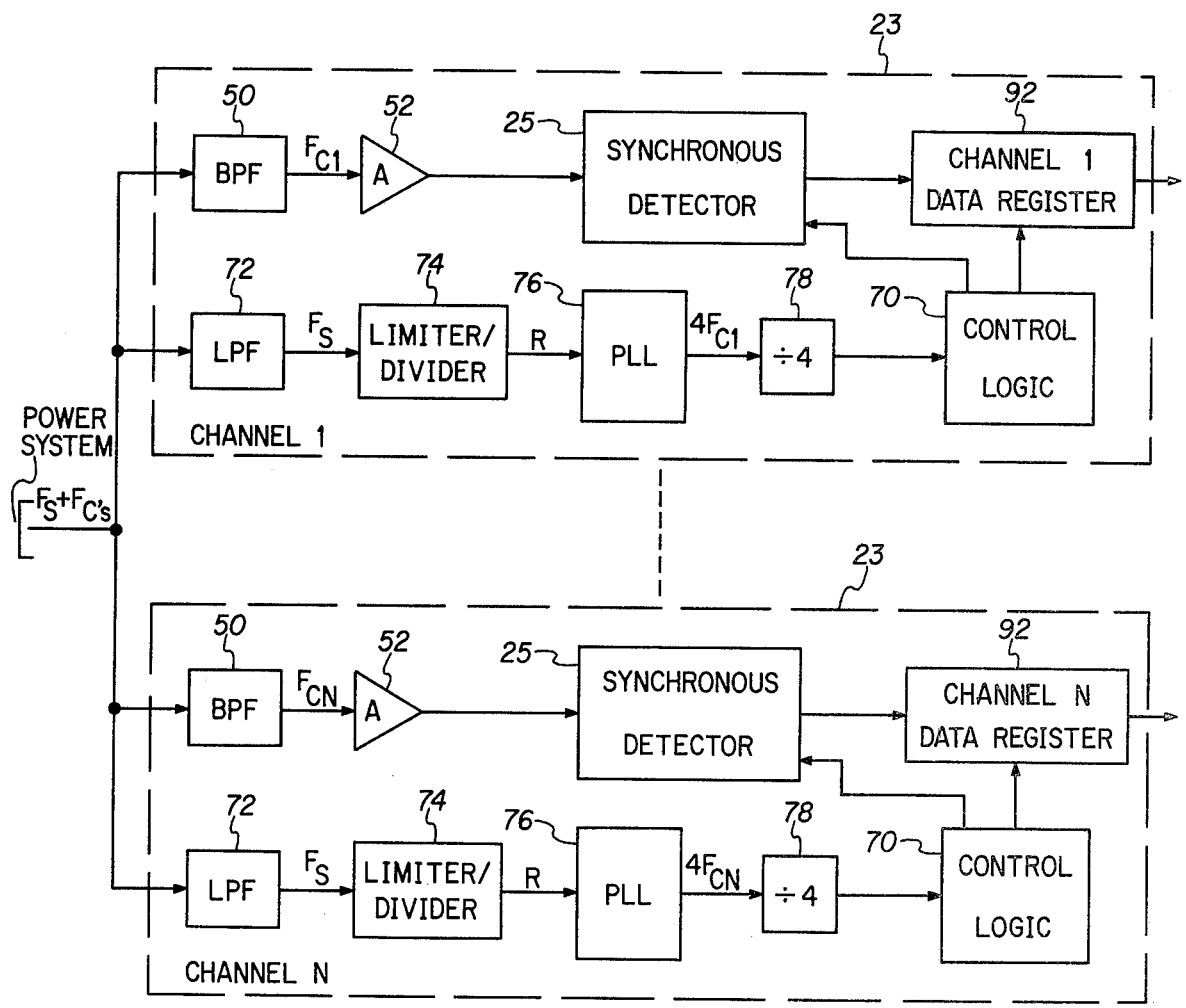
FIG. 3 is a block diagram of a multiplex receiver for implementing the invention herein.

A multiplex receiver, designated generally as 21, for implementing the invention is shown in FIG. 3. N plurality of channels 23 receive the fundamental system frequency $F_s$ and the carrier signals $F_c$ from the power system. Each channel 23 contains two paths, with the upper path routing the carrier signal $F_c$ for detecting the data and the lower path for providing the timing and frequency injection signals. Accordingly, the upper path of each channel 23 consists of a bandpass filter 50 that excludes distant harmonics to protect the dynamic range of the amplifier 52, and synchronous detector 25 whose output provides DC signals whose polarity is indicative of the transmitted data and a data register 92 in which the data is stored for subsequent output. Although synchronous detection employing integrated DC signals, as detailed hereinafter, is preferred, as will be subsequently realized, the invention may be implemented with other types of detectors, such as employ AC integrated signals as delineated in U.S. Pat. No. 2,905,812 entitled "High Information Capacity Phase-Pulse Multiplex System". The lower path for providing the requisite injection and timing signals consists of a low pass filter 72, limiter/divider 74, and phase lock loop circuit 76 that operate like their counterparts in FIG. 2 to develop $4F_c$, synchronized to the selected subharmonic of $F_s$. The output $4F_c$ of phase lock loop circuit 76 is applied via a divide by four circuit 78 to a control logic circuit 70 through two quadrature related signals for providing the injection and timing signals at the output of control logic circuit 70, this arrangement being necessitated only by the four-phase modulation scheme preferably chosen for implementing the invention. Once again if desired, low pass filter 72 and limiter/divider 74 can be shared among channels, as well as with the transmitter 11 of FIG. 2. Similarly bandpass filter 50 can be shared among receiver channels. Amplifier 52 can provide buffer isolation between synchronous detectors, however, and should probably not be shared.

Figure 4:
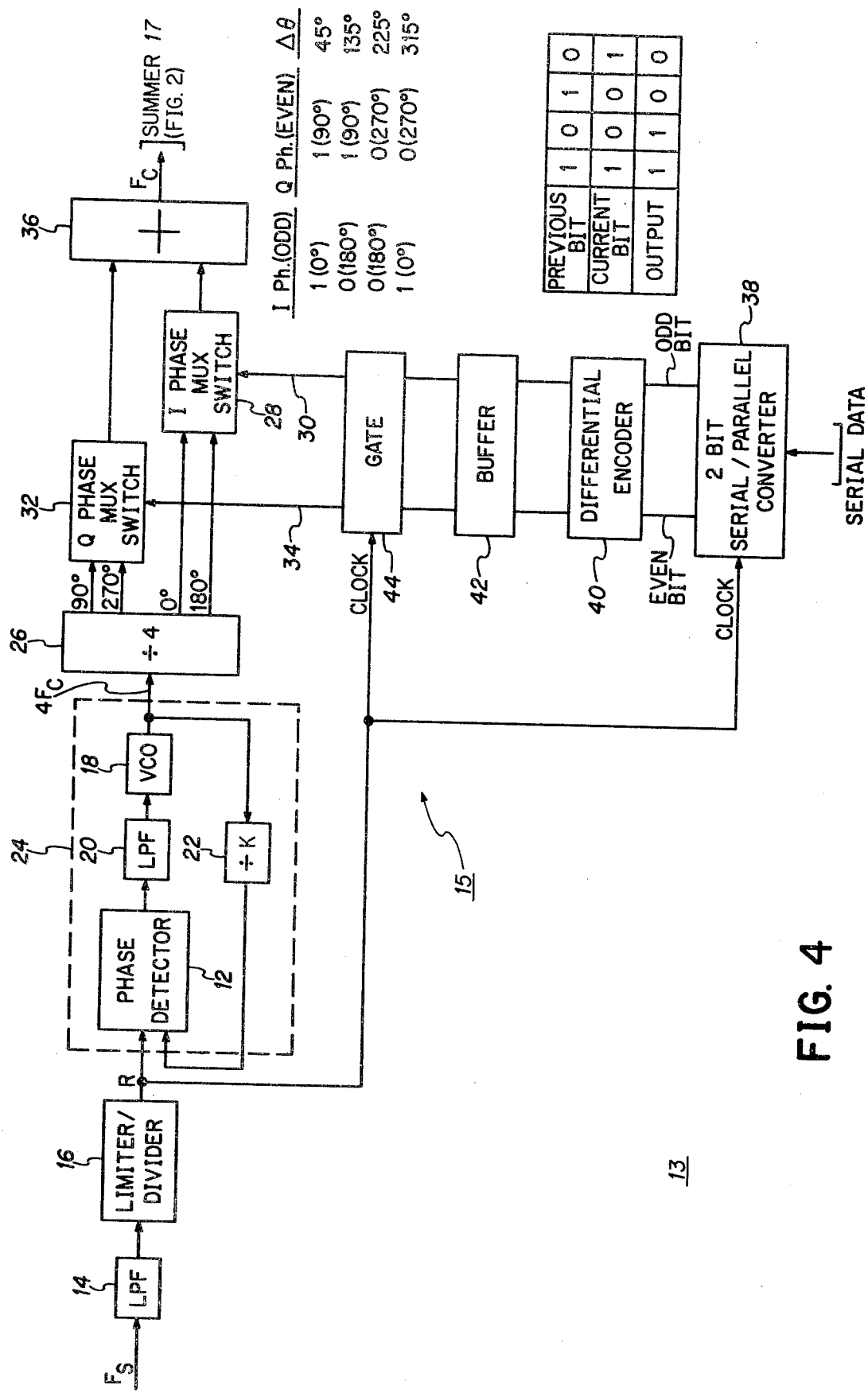
FIG. 4 is a detailed block diagram corresponding to one of the channels of the transmitter of FIG. 2.

A detailed block diagram for one of the transmitter channels 13 of FIG. 2 is shown in FIG. 4, wherein the power system frequency signal $F_s$ is applied as a first input to a phase detector 12 upon passage through the low pass filter 14 and limiter/divider 16. Phase detector 12, together with a voltage controlled oscillator (VCO) 18 to which the detector 12 output is applied via a low pass filter 20, and a K frequency divider circuit 22 interconnecting the output of VCO 18 with a second input to phase detector 12 comprise the phase lock loop circuit 24. The output frequency of VCO 18, $4F_c$ ($4F_c$ being determined by the value of K and R thus tracks $F_s$) so that as the power system frequency varies so does the carrier signal $F_c$ to maintain correspondence therewith and thus the nulls of the (sin x)/x function vis-a-vis the power system frequency harmonics $F_H$. The remaining, as yet unaddressed, apparatus of FIG. 4 comprise the modulator 15.

As delineated in U.S. Pat. No. 3,368,036 covering the Kineplex System, previously alluded to, the carrier signal $F_c$ is advanced by 45° or some odd multiple thereof during each baud period dependent on the values of the two bits which comprise the baud. This is reflected in the table of FIG. 4 showing the change in phase angle $\Delta\theta$ as a function of both the first or odd bit (in-phase channel) of each bit pair constituting a baud and the second or even bit (quadrature channel) of the pair. Thus, if both bits are high or equal to a logic level one, the carrier phase angle is advanced 45°, and so forth. The angle in parentheses alongside the bit value of the table shows the change in its channel angle to achieve the net incremental change in carrier phase angle $\Delta\theta$. The table is effectuated by applying the output, $4F_c$, of VCO 18 to a divide by four circuit 26, having four outputs, all of which have the same frequency $F_c$ but differ in phase angle by 90° beginning with a 0° phase angle. $F_c$ is of course selected so as to coincide with the asymmetric location between the two adjacent power system harmonics $F_H$ as previously delineated. The 0° and 180° output leads are applied to an in-phase multiplexing (mux) switch 28 having a single output which is connected to the 0° input lead when the control bit on lead 30 to mux switch 28 corresponds to a logic level one and to the 180° input lead when the control bit on lead 30 corresponds to a logic level zero. In similar fashion, the 90° and 270° output leads of divide by four circuit 26 are connected to a quadrature phase mux switch 32 whose single output lead is connected to the 90° input lead when the control bit on input lead 34 thereto corresponds to a logic level one and to the 270° input lead when the control bit corresponds to a logic level zero. The outputs of mux switches 28 and 32 are vectorially added in summer 36 whose output then provides the modulated carrier signal $F_c$ which is applied to summer 17 of FIG. 2.

The control bits on leads 30 and 34 are derived from the serial data for conveyance by the carrier signal $F_c$ by first applying the serial data to a two bit serial/parallel converter 38 wherein each two bits of consecutive serial data is converted to the parallel outputs corresponding to the first or odd bit and the second or even bit under a suitable baud timing clock derived from the output of limiter 16. The two output bits of converter 38 are applied to a differential encoder 40 wherein they are compared with the previous bits to afford differential modulation wherein the carrier signal phase angle in each baud period serves as the reference signal for the next consecutive baud period. As shown by the accompanying table, no change in bit value in the current baud period from the previous baud period produces a "1" output control bit while a change produces a "0" output control bit. The control bit outputs of differential encoder 40 are then applied to their respective mux switches 28 and 32 via a buffer circuit 42 which is employed to accommodate any time disparities between the serial data rate and the carrier signal transmission baud rate and a gate 44 which is strobed from the output of limiter/divider 16 which enables gate 44 at the beginning of each baud period so as to maintain baud timing synchronization.

Figure 5:
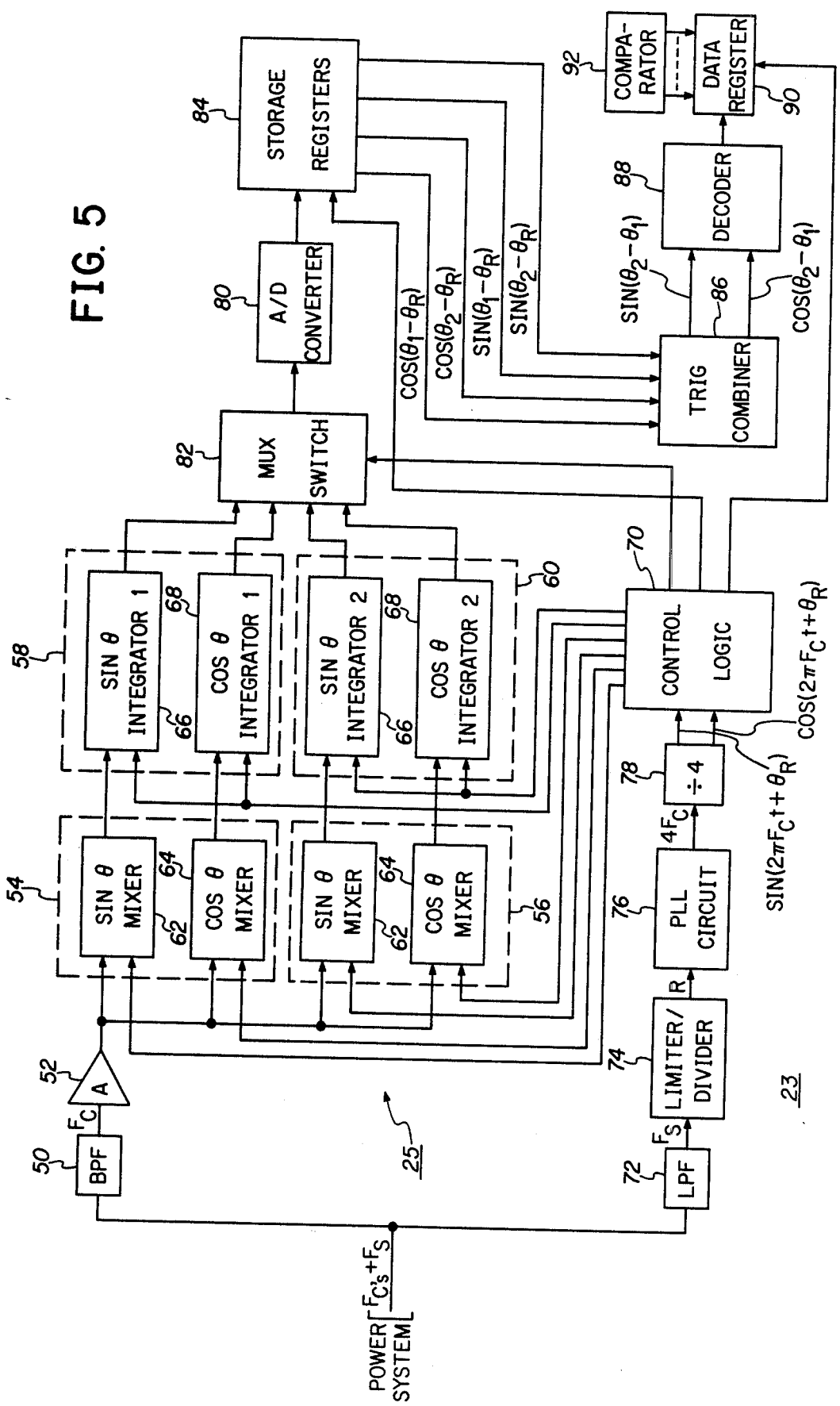
FIG. 5 is a detailed block diagram of one of the channels of the receiver of FIG. 3.

The detailed block diagram for one of the receiver channels 23 of FIG. 3 is shown in FIG. 5. Since the operation of this circuit is described in detail in a copending commonly owned patent application bearing Ser. No. 015,672, entitled "Detection Means For Providing Multiple Baud Values Of An Individual Baud Period Of A Carrier Signal To Obviate Baud Timing Ambiguities" it will be treated only briefly herein. The carrier signals $F_{c's}$ and power system frequency signal $F_s$ and harmonics $F_H$ thereof near $F_{c's}$ received from the power system are split into two paths, with the carrier signals $F_{c's}$ and $F_H$ being routed via the upper path through the bandpass filter 50 and amplifier 52 to a pair of mixer circuits 54 and 56, with each being associated with a pair of integrator circuits 58 and 60, respectively. With the exception of the lower path and bandpass filter 50, amplifier 52 and a data register 92 and associated comparator 94, all of the apparatus shown in FIG. 5 comprise the synchronous detector 25 of FIG. 3. Each mixer circuit 54 and 56 consists of a sin $\theta$ mixer 62 for providing a DC signal which corresponds to the quadrature component (even bit) and a cos $\theta$ mixer 64 for providing the in-phase component (odd bit). Each of the integrator circuits 58 and 60 consists of a sin $\theta$ integrator 66 and cos $\theta$ integrator 68 for integrating the DC signals applied thereto from its respective mixer circuit during alternate baud periods, with one of the integrator circuits integrating during odd periods and the other during the even periods. During the non-integration periods, each integrator circuit 58 and 60 is initialized to a predetermined state preparatory to its ensuing integration period. The outputs of integrators 66 and 68 are representative of the two bit values in each baud period by virtue of their respective signs. It is to be noted that as long as the reciprocal of these integration periods are submultiples of the power system frequency $F_s$, the nulling benefits associated with the (sin x)/x function are obtained, notwithstanding that the baud transmission time interval may be chosen longer and not itself so related to the power system frequency $F_s$. This permits guard times to be optionally employed at the beginning and end of each integration interval vis-a-vis the transmission baud interval so as to eliminate the possibility of signal energy in one baud period extending into the consecutive baud period, which could otherwise impair the detection process. When the baud transmission period per channel exceeds the receiver integration period, the notation R of FIG. 1 for nulling out the harmonics corresponds to the reciprocal of the receiver integration period and not the baud transmission period.

The DC outputs of mixer circuits 54 and 56 are provided through synchronous detection by phase comparison with the carrier signal $F_c$ a signal of like frequency, differing in phase therefrom by either some fixed phase angle $\theta_R$ (for cos $\theta$ mixers 64) or $\theta_R + 90°$ (for sin $\theta$ mixers 62). These signals are applied to mixer circuits 54 and 56 in the appropriate baud periods at the output of the control logic circuit 70 which is located in the lower path to which the power system frequency $F_s$ is applied upon passage through low pass filter 72. After passage through the limiter/divider circuit 74 to develop the square wave signal with frequency R, the signal R is applied to the phase lock loop circuit 76 whose output, which is equal to $4F_c$, is then divided by 4 via the divide by four circuit 78 to provide at its output the two quadrature related mixing signals.

The analog outputs of integrator circuits 58 and 60 are converted to digital values via an A/D converter 80 upon sequential passage through a mux switch 82 under the control of an output from control logic circuit 70. The digital signal outputs of converter 80 are then retained in storage registers 84 so that the phase information during each baud period can be compared with that for the immediately preceding period in order to eliminate the phase angle $\theta_R$ and obtain the difference between $\theta_2$ and $\theta_1$ wherein the subscript 2 designates the current baud period and the subscript 1 designates the immediately preceding baud period. The foregoing data retention is of course required only because a differential modulation scheme is preferred over an absolute reference scheme so as to establish a correctly phased reference signal for the detector. The data bit values which are defined by the sin and cos of $\Delta\theta$, $\Delta\theta$ being equal to $\theta_2 - \theta_1$, are formulated in trigonometric combiner 86 which are then applied to decoder 88 which implements the table of FIG. 3 to produce at its output the two serial bits contained in the baud period. The output of decoder 88 is entered into a data register 90, under the control of an output from control logic circuitry 70, which functions as a shift register to receive and store bits until a predetermined bit pattern such as in a preamble and address field is recognized by virtue of comparison with a comparator circuit 92. Upon recognition of a valid message, the data contained in register 90 is then shifted out to a permanent register (not shown) for appropriate processing.

It is to be understood that the invention herein is not limited to the foregoing four-phase DPSK modulation scheme which was presented only as an exemplary application thereof. Accordingly, the scope and spirit of the invention are to be limited only by the claims which will now be set forth hereinbelow.

What is claimed is:

1. Apparatus for transmitting digital data by frequency division multiplexed carrier signals through a medium polluted with harmonic signals whereby the harmonics may be nulled in the receiver detector, comprising:

means for generating a first carrier signal whose frequency is asymmetrically positioned between two of the adjacent harmonics;

means for modulating the first carrier signal with digital data at a baud rate so that the spectral density nulls of the modulated carrier signal in the frequency domain coincide with said two adjacent harmonics;

means for generating at least one additional carrier signal whose frequency is also positioned between said two adjacent harmonics but is different from that of the first carrier signal and whose frequency separation from any adjacent carrier signal is equal to the baud rate or some multiple thereof, and means for modulating each additional carrier signal with digital data at said baud rate.

2. The apparatus of claim 1 wherein the medium is an electric power system and the harmonics are multiples of the power system frequency.

3. A method for transmitting digital data by frequency division multiplexed carrier signals through a medium polluted with harmonic signals whereby the harmonics may be nulled in the receiver detector, comprising:

generating a first carrier signal whose frequency is asymmetrically positioned between two of the adjacent harmonics;

modulating the first carrier signal with digital data at a baud rate so that the spectral density nulls of the modulated carrier signal in the frequency domain coincide with said two adjacent harmonics;

generating at least one additional carrier signal whose frequency is also positioned between said two adjacent harmonics but is different from that of the first carrier signal and whose frequency separation from any adjacent carrier signal is equal to the baud rate or some multiple thereof, and modulating each additional carrier signal with digital data at said baud rate.

4. A system for communicating digital data through a medium polluted with harmonic signals by passing frequency division multiplexed modulated carrier signals therethrough having a characteristic which is varied in a predetermined manner during each baud period representative of the data, comprising:

means for generating a first carrier signal whose frequency is asymmetrically positioned between two of the adjacent harmonics;

means for generating at least one additional carrier signal whose frequency is also positioned between said two adjacent harmonics but is different from that of the first carrier signal and whose frequency separation from any adjacent carrier signal is equal to the reciprocal of a predetermined time interval or some multiple thereof;

means for modulating the carrier signals with individual digital data streams at a rate equal to the reciprocal of the baud period;

means for applying the modulated carrier signals to the medium at some point;

means for receiving the modulated carrier signals from the medium at another point;

detector means for demodulating the carrier signals by converting the variable characteristic thereof to representative signals, and means for integrating said representative signals during each baud period for said predetermined time interval that places spectral density nulls of said detector means response in the frequency domain at said two adjacent harmonics.

5. The system of claim 4 wherein said predetermined time interval is equal to the baud period.

6. The system of claim 4 wherein the medium is an electric power system and the harmonics are multiples of the power system frequency.

7. The system of claims 4, 5 or 6 wherein said detector means is a synchronous detector and said representative signals are DC signals.

* * * * *

UNITED STATES PATENT AND TRADEMARK OFFICE
CERTIFICATE OF CORRECTION

PATENT NO. : 4,244,047
DATED : January 6, 1981
INVENTOR(S) : William C. Perkins

It is certified that error appears in the above-identified patent and that said Letters Patent are hereby corrected as shown below:

Column 2, line 55, delete "015,672" before the word "previously" and substitute therefor --021,529--.

Signed and Sealed this

Twenty-ninth Day of September 1981

[SEAL]

Attest:

Attesting Officer

GERALD J. MOSSINGHOFF

Commissioner of Patents and Trademarks